United States Patent [19]

Quinn

[11] Patent Number: 4,591,612

[45] Date of Patent: May 27, 1986

[54] CROSS-LINKABLE COMPOSITIONS CONTAINING NON-NEWTONIAN COLLOIDAL DISPERSE SYSTEMS

[75] Inventor: Robert E. Quinn, Cleveland, Ohio

[73] Assignee: The Lubrizol Corporation, Wickliffe, Ohio

[21] Appl. No.: 700,359

[22] Filed: Feb. 11, 1985

[51] Int. Cl.$^4$ ............................................... C08K 3/26
[52] U.S. Cl. .................................... 524/425; 524/439; 524/440; 524/441; 524/590
[58] Field of Search ................ 524/425, 439, 440, 441, 524/590

[56] References Cited

U.S. PATENT DOCUMENTS

| | | | |
|---|---|---|---|
| 3,384,586 | 5/1968 | McMillen | 524/425 |
| 3,492,231 | 1/1970 | McMillen | 524/394 |
| 3,932,342 | 1/1976 | Nagata | 524/441 |
| 4,436,855 | 3/1984 | Higgins | 524/590 |
| 4,443,577 | 4/1984 | Higgins | 524/590 |

Primary Examiner—Paul R. Michl
Attorney, Agent, or Firm—Karl Bozicevic; Denis A. Polyn; Forrest L. Collins

[57] ABSTRACT

A composition is disclosed which comprises:
(A) a non-Newtonian colloidal disperse system characterized by a neutralization base number of about 3 or less, said system comprising
  (1) solid metal containing colloidal particles predispersed in
  (2) a liquid dispersing medium, and
  (3) as a third component, at least one organic compound which is soluble in said dispersing medium, the molecules of said organic compound being characterized by a hydrophobic portion and at least one polar substituent; and
(B) at least one cross-linkable material other than an isocyanate; and, optionally
(C) at least one cross-linking agent.

41 Claims, No Drawings

CROSS-LINKABLE COMPOSITIONS CONTAINING NON-NEWTONIAN COLLOIDAL DISPERSE SYSTEMS

TECHNICAL FIELD

This invention relates to cross-linkable compositions and, more particularly, to cross-linkable compositions containing non-Newtonian colloidal dispersed systems. These compositions are useful as caulks, extruding compositions, molding compositions and the like, but have particular utility as high solids thermosetting coating compositions.

BACKGROUND OF THE INVENTION

Coating compositions which have been used heretofore have been primarily organic-solvent based compositions, typically containing high-solvent concentrations of 40–50% by weight or more. Use of such solvent-based coatings have caused significant air pollution problems resulting from the evaporation of organic solvents into the atmosphere during cure.

One alternative to such solvent-based coatings that has been proposed is the use of "high solids" formulations. Theoretically, these proposed formulations would contain at least about 60% by volume solids, preferably at least about 85% by volume or higher, with the remainder being organic and/or water solvent. The term "solids" is used herein and in the appended-to claims to mean the portion of the composition which is not subject to evaporation during cure. The "solids" may or may not themselves be solid before cure. Typically, the "solids" in the described compositions include resins.

Heretofore, commercially acceptable high solids liquid coating compositions have not been produced. One reason is that it has not been possible to make high solids formulations having sufficiently low viscosities to provide satisfactory coatings flow. For example, attempts to utilize traditional polyesters having molecular weights on the order of about 2000 and higher have been found to produce formulations having viscosities which are too high to be useful at high solids levels for many coating operations. On the other hand, use of low molecular weight polyesters, while reducing viscosities to desirable levels, does not produce useful high solids compositions because of the loss of significant amounts of the polyester compounds during cure due to their relatively high volatility.

U.S. Pat. Nos. 3,384,586 and 3,492,231 disclose resinous compositions containing a polymeric resin such as a polyolefin, polyamide, acrylic, polystyrene, polysulfide, polyether, polyester, melamine resin, alkyd resin and the like in combination with a non-Newtonian colloidal disperse system comprising (1) solid metal-containing colloidal particles predispersed in (2) a dispersing medium and (3) as an essential third component at least one organic compound which is soluble in said dispersing medium, the molecules of said organic compound being characterized by a hydrophobic portion and at least one polar substituent. The present invention is distinguishable from these references by virtue of the fact that the references disclose the use of the non-Newtonian colloidal disperse systems in combination with fully polymerized resins, while the present invention relates to the combination of such non-Newtonian colloidal disperse systems with cross-linkable materials. The problems inherent in the preparation of compositions containing cross-linkable materials which have not been fully cured are not recognized in either of these references, and the solutions to such problems are not provided.

U.S. Pat. Nos. 4,436,855 and 4,443,577 disclose urethane coating compositions containing non-Newtonian colloidal disperse systems comprising (1) solid metal-containing colloidal particles predispersed in (2) a disperse medium of at least one inert organic liquid and (3) as an essential third component at least one member selected from the class consisting of organic compounds which are substantially soluble in said disperse medium, the molecules of said organic compound being characterized by polar substituents and hydrophobic portions. The former patent relates to two-component urethane coating systems which further comprise an organic polyfunctional isocyanate and an acidic ester of a phosphoric acid. The latter patent relates to one-component moisture curable urethane coating compositions which further comprise an isocyanate-terminated prepolymer.

U.S. Pat. No. 4,425,466 discloses coating compositions containing a partially methylated partially methylolated melamine and a polyfunctional compound containing on average at least two functional groups per molecule selected from the group consisting of carboxy, hydroxy, primary and secondary amide and urethane. The reference indicates that the coating compositions are stable at ambient temperature and capable of fast cure response at relatively low curing temperatures.

SUMMARY OF THE INVENTION

The present invention contemplates the provision of cross-linkable compositions containing non-Newtonian colloidal disperse systems. These compositions are useful as high-solids, thermosetting caulks, molding compositions, extruding compositions and the like, but are particularly suitable for use as high solids thermosetting coating compositions. These coating compositions are heat-stable and sag-resistant and exhibit at most only minimal increases in package viscosity. These compositions exhibit long-term storage stability and are characterized by superior anti-settling properties. These compositions are useful in providing coatings with good gloss which is in contrast to currently available solid particulate type rheology control agents which tend to lower gloss.

Broadly stated, the present invention provides for a composition comprising:
(A) a non-Newtonian colloidal disperse system characterized by a neutralization base number of about 3 or less, said system comprising
  (1) solid metal containing colloidal particles predispersed in
  (2) a liquid dispersing medium, and
  (3) as a third component, at least one organic compound which is soluble in said dispersing medium, the molecules of said organic compound being characterized by a hydrophobic portion and at least one polar substituent; and
(B) at least one cross-linkable material other than an isocyanate; and, optionally
(C) at least one cross-linking agent.

DETAILED DESCRIPTION OF THE PREFERRED EMBODIMENT

The term "hydrocarbyl" is used herein to include substantially hydrocarbyl groups (for example, substantially hydrocarbyloxy, etc.), as well as purely hydrocarbyl groups. The description of these groups as being substantially hydrocarbyl means that they contain no non-hydrocarbyl substituents or non-carbon atoms which significantly affect the hydrocarbyl characteristics or properties of such groups relevant to their uses as described herein.

Non-limiting examples of substituents which do not significantly alter the hydrocarbyl characteristics or properties of the general nature of the hydrocarbyl groups of this invention are the following:
Ether groups (especially hydrocarbyloxy such as phenoxy, benzyloxy, methoxy, n-butoxy, etc., and particularly alkoxy groups of up to about 10 carbon atoms);
Oxo groups (e.g., —O— linkages in the main carbon chain);
Nitro groups;
Thioether groups (especially $C_{1-10}$ alkyl thioether);
Thia groups (e.g., —S— linkages in the main carbon chain);
Carbohydrocarbyloxy groups (e.g.,

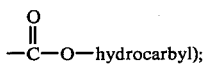

Sulfonyl groups (e.g.,

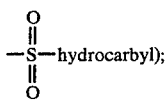

Sulfinyl groups (e.g.,

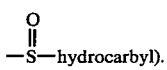

This list is intended to be merely illustrative and not exhaustive, and the omission of a certain class of substituent is not meant to require its exclusion. In general, if such substituents are present, there will not be more than two for each 10 carbon atoms in the substantially hydrocarbyl group and preferably not more than one for each 10 carbon atoms since this number of substituents usually will not substantially affect the hydrocarbyl characteristics and properties of the group. Nevertheless, the hydrocarbyl groups usually will be free from non-hydrocarbon groups; that is, they will be purely hydrocarbyl groups consisting of only carbon and hydrogen atoms.

The term "lower" as used in the present specification and claims, when used in conjunction with terms such as alkyl, alkenyl, alkoxy, and the like, is intended to describe such groups which contain a total of up to 7 carbon atoms.

The Non-Newtonian Disperse Systems (A)

The terminology "disperse system" as used in the specification and claims is a term of art generic to colloids or colloidal solutions, e.g., "any homogenous medium containing dispersed entities of any size and state," Jirgensons and Straumanis, "A Short Textbook on Colloidal Chemistry" (2nd Ed.) The Macmillan Co., New York, 1962 at page 1. However, the particular disperse systems of the present invention form a subgenus within this broad class of disperse system, this subgenus being characterized by several important features.

This subgenus comprises those disperse systems wherein at least a portion of the particles dispersed therein are solid, metal-containing particles formed in situ. At least about 10% to about 50% are particles of this type and preferably, substantially all of said solid particles are formed in situ.

So long as the solid particles remain dispersed in the dispersing medium as colloidal particles the particle size is not critical. Ordinarily, the particles will not exceed about 5000 A. (The abbreviation "A" herein refers to angstroms.) However, it is preferred that the maximum unit particle size be less than about 1000 A. In a particularly preferred aspect of the invention, the unit particle size is less than about 400 A. Systems having a unit particle size in the range of about 50 A. to 300 A. give excellent results. The minimum unit particle size is generally at least about 20 A. and preferably at least about 30 A.

The language "unit particle size" is intended to designate the average particle size of the solid, metal-containing particles assuming maximum dispersion of the individual particles throughout the disperse medium. That is, the unit particle is that particle which corresponds in size to the average size of the metal-containing particles and is capable of independent existence within the disperse system as a discrete colloidal particle. These metal-containing particles are found in two forms in the disperse systems. Individual unit particles can be dispersed as such throughout the medium or unit particles can form an agglomerate, in combination with other materials (e.g., another metal-containing particle, the disperse medium, etc.) which are present in the disperse systems. These agglomerates are dispersed through the system as "metal containing particles". Obviously, the "particle size" of the agglomerate is substantially greater than the unit particle size. Furthermore, it is equally apparent that this agglomerate size is subject to wide variations, even within the same disperse system. The agglomerate size varies, for example, with the degree of shearing action employed in dispersing the unit particles. That is, mechanical agitation of the disperse system tends to break down the agglomerates into the individual components thereof and disperse these individual components through the disperse medium. The ultimate in dispersion is achieved when each solid, metal-containing particle is individually dispersed in the medium. Accordingly, the disperse systems are characterized with reference to the unit particle size, it being apparent to those skilled in the art that the unit particle size represents the average size of solid, metal-containing particles present in the system which can exist independently. The average particle size of the metal-containing solid particles in the system can be made to approach the unit particle size value by the application of a shearing action to the existent system or during the formation of the disperse system as the particles are being formed in situ. It is not necessary that maximum particle dispersion exist to have useful disperse systems. The agitation associated with homogenization of the overbased material and conversion agent produces sufficient particle dispersion.

Basically, the solid metal-containing particles are in the form of metal salts of inorganic acids, and low molecular weight organic acids, hydrates thereof, or mixtures of these. These salts are usually the alkali and alkaline earth metal formates, acetates, carbonates, hydrogen carbonates, hydrogen sulfides, sulfites, hydrogen sulfites, and halides, particularly chlorides. In other words, the metal-containing particles are ordinarily particles of metal salts, the unit particle is the individual salt particle and the unit particle size is the average particle size of the salt particles which is readily ascertained, as for example, by conventional X-ray diffraction techniques. Colloidal disperse systems possessing particles of this type are sometimes referred to as macromolecular colloidal systems.

Because of the composition of the colloidal disperse systems of this invention, the metal-containing particles also exist as components in micellar colloidal particles. In addition to the solid, metal-containing particles and the disperse medium, the colloidal disperse systems of the invention are characterized by a third component, one which is soluble in the medium and contains in the molecules thereof a hydrophobic portion and at least one polar substituent. This third component can orient itself along the external surfaces of the above metal salts, the polar groups lying along the surface of these salts with the hydrophobic portions extending from the salts into the disperse medium forming micellar colloidal particles. These micellar colloids are formed through weak intermolecular forces, e.g., Van der Waals forces, etc. Micellar colloids represent a type of agglomerate particle as discussed hereinabove. Because of the molecular orientation in these micellar colloidal particles, such particles are characterized by a metal-containing layer (i.e., the solid metal-containing particles and any metal present in the polar substituent of the third component, such as the metal in a sulfonic or carboxylic acid salt group), a hydrophobic layer formed by the hydrophobic portions of the molecules of the third component and a polar layer bridging said metal-containing layer and said hydrophobic layer, said polar bridging layer comprising the polar substituents of the third component of the system, e.g., the

group if the third component is an alkaline earth metal petrosulfonate.

The second component of the colloidal disperse system is the dispersing medium. The identity of the medium is not a particularly critical aspect of the invention as the medium primarily serves as the liquid vehicle in which solid particles are dispersed. The medium can have components characterized by relatively low boiling point, e.g., in the range of about 25° to about 120° C. to facilitate subsequent removal of a portion or substantially all of the medium from the compositions of the invention or the components can have a higher boiling point to protect against removal from such compositions upon standing or heating. There is no criticality in an upper boiling point limitation on these liquids.

Representative liquids include mineral oils, the alkanes and haloalkanes of about 5 to about 18 carbon atoms, polyhalo- and perhaloalkanes of up to about 6 carbons, the cycloalkanes of about 5 or more carbons, the corresponding alkyl- and/or halo-substituted cycloalkanes, the aryl hydrocarbons, the alkylaryl hydrocarbons, the haloaryl hydrocarbons, ethers such as dialkyl ethers, alkyl aryl ethers, cycloalkyl ethers, cycloalkylalkyl ethers, alkanols, alkylene glycols, polyalkylene glycols, alkyl ethers of alkylene glycols and polyalkylene glycols, dibasic alkanoic acid diesters, silicate esters, and mixtures of these. Specific examples include petroleum ether, Stoddard Solvent, pentane, hexane, octane, isooctane, undecane, tetradecane, cyclopentane, cyclohexane, isopropylcyclohexane, 1,4-dimethylcyclohexane, cyclooctane, benzene, toluene, xylene, ethyl benzene, tert-butyl-benzene, halobenzenes especially mono- and polychlorobenzenes such as chlorobenzene per se and 3,4-dichlorotoluene, mineral oils, n-propylether, isopropylether, isobutylether, n-amylether, methyl-n-amylether, cyclohexylether, ethoxycyclohexane, methoxybenzene, isopropoxybenzene, p-methoxytoluene, methanol, ethanol, propanol, isopropanol, hexanol, n-octyl alcohol, n-decyl alcohol, alkylene glycols such as ethylene glycol and propylene glycol, diethyl ketone, dipropyl ketone, methylbutyl ketone, acetophenone, 1,2-difluoro-tetrachloroethane, dichlorofluoromethane, 1,2-dibromotetrafluoroethane, trichlorofluoromethane, 1-chloropentane, 1,3-dichlorohexane, formamide, dimethylformamide, acetamide, dimethylacetamide, diethylacetamide, propionamide, diisooctyl azelate, polyethylene glycols, polypropylene glycols, hexa-2-ethylbutoxy disiloxane, etc.

Also useful as dispersing medium are the low molecular weight, liquid polymers, generally classified as oligomers, which include the dimers, tetramers, pentamers, etc. Illustrative of this large class of materials are such liquids as the propylene tetramers, isobutylene dimers, and the like.

The alkyl, cycloalkyl, and aryl hydrocarbons represent a preferred class of disperse mediums. Liquid petroleum fractions represent another preferred class of disperse mediums. Included within these preferred classes are benzenes and alkylated benzenes, cycloalkanes and alkylated cycloalkanes, cycloalkenes and alkylated cycloalkenes such as found in naphthene-based petroleum fractions, and the alkanes such as found in the paraffin-based petroleum fractions. Petroleum ether, naphthas, mineral oils, Stoddard Solvent, toluene, xylene, etc., and mixtures thereof are examples of economical sources of suitable inert organic liquids which can function as the disperse medium in the colloidal disperse systems of the present invention. Mineral oil can serve by itself as the disperse medium.

In addition to the solid, metal-containing particles and the disperse medium, the disperse systems employed herein require a third essential component. This third component is an organic compound which is soluble in the disperse medium, and the molecules of which are characterized by a hydrophobic portion and at least one polar substituent. As explained, infra, the organic compounds suitable as a third component are extremely diverse. These compounds are inherent constituents of the disperse systems as a result of the methods used in preparing the systems. Further characteristics of the components are apparent from the following discussion of methods for preparing the colloidal disperse systems.

Preparation of the Non-Newtonian Disperse Systems
(A)

Broadly speaking, the colloidal disperse systems of the invention are prepared by treating a single phase homogeneous, Newtonian system of an "overbased", "superbased", or "hyperbased", organic compound with a conversion agent, usually an active hydrogen containing compound, the treating operation being simply a thorough mixing together of the two components, i.e., homogenization. This treatment converts these single phase systems into the non-Newtonian colloidal disperse systems utilized in the compositions of the present invention.

The terms "overbased", "superbased", and "hyperbased", are terms of art which are generic to well known classes of metal-containing materials. These overbased materials have also been referred to as "complexes", "metal complexes", "high-metal containing salts", and the like. Overbased materials are characterized by a metal content in excess of that which would be present according to the stoichiometry of the metal and the particular organic compound reacted with the metal, e.g., a carboxylic or sulfonic acid. Thus, if a monosulfonic acid,

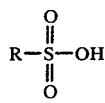

is neutralized with a basic metal compound, e.g., calcium hydroxide, the "normal" metal salt produced will contain one equivalent of calcium for each equivalent of acid, i.e.,

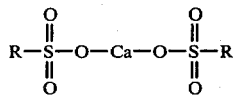

However, as is well known in the art, various processes are available which result in an inert organic liquid solution of a product containing more than the stoichiometric amount of metal. The solutions of these products are referred to herein as overbased materials. Following these procedures, the sulfonic acid or an alkali of alkaline earth metal salt thereof can be reacted with a metal base and the product will contain an amount of metal in excess of that necessary to neutralize the acid, for example, 4.5 times as much metal as present in the normal salt or a metal excess of 3.5 equivalents. The actual stoichiometric excess of metal can vary considerably, for example, from about 0.1 equivalent to about 30 or more equivalents depending on the reactions, the process conditions, and the like. The overbased materials useful in preparing the disperse systems of the invention will generally contain from about 3.5 to about 30 or more equivalents of metal for each equivalent of material which is overbased.

In the present specification and claims the term "overbased" is used to designate materials containing a stoichiometric excess of metal and is, therefore, inclusive of those materials which have been referred to in the art as overbased, superbased, hyperbased, etc., as discussed supra.

The terminology "metal ratio" is used in the prior art and herein to designate the ratio of the total chemical equivalents of the metal in the overbased materials (e.g, a metal sulfonate or carboxylate) to the chemical equivalents of the metal in the product which would be expected to result in the reaction between the organic material to be overbased (e.g, sulfonic or carboxylic acid) and the metal-containing reactant (e.g., calcium hydroxide, barium oxide, etc.) according to the known chemical reactivity and stoichiometry of the two reactants. Thus, in the normal calcium sulfonate discussed above, the metal ratio is one, and in the overbased sulfonate, the metal ratio is 4.5. Obviously, if there is present in the material to be overbased more than one compound capable of reacting with the metal, the "metal ratio" of the product will depend upon whether the number of equivalents of metal in the overbased product is compared to the number of equivalents expected to be present for a given single component or a combination of all such components.

The overbased materials are prepared by treating a reaction mixture comprising the organic material to be overbased, a reaction medium consisting essentially of at least one inert, organic solvent for said organic material, a stoichiometric excess of a metal base, and a promoter with an acidic material. The methods for preparing the overbased materials as well as an extremely diverse group of overbased materials are well known in the prior art and are disclosed for example in the following U.S. Pat. Nos.: 2,616,904; 2,616,905; 2,616,906; 2,616,911; 2,616,924; 2,616,925; 2,617,049; 2,695,910; 2,723,234; 2,723,235; 2,723,236; 2,760,970; 2,767,164; 2,767,209; 2,777,874; 2,798,852; 2,839,470; 2,856,359; 2,859,360; 2,856,361; 2,861,951; 2,883,340; 2,915,517; 2,959,551; 2,968,642; 2,971,014; 2,989,463; 3,001,981; 3,027,325; 3,070,581; 3,108,960; 3,147,232; 3,133,019; 3,146,201; 3,152,991; 3,155,616; 3,170,880; 3,170,881; 3,172,855; 3,194,823; 3,223,630; 3,232,883; 3,242,079; 3,242,080; 3,250,710; 3,256,186; 3,274,135; 3,492,231; and 4,230,586. These patents disclose processes, materials which can be overbased, suitable metal bases, promoters, and acidic materials, as well as a variety of specific overbased products useful in producing the disperse systems of this invention and are, accordingly, incorporated herein by reference.

An important characteristic of the organic materials which are overbased is their solubility in the particular reaction medium utilized in the overbasing process. As the reaction medium used previously has normally comprised petroleum fractions, particularly mineral oils, these organic materials have generally been oil-soluble. However, if another reaction medium is employed (e.g., aromatic hydrocarbons, aliphatic hydrocarbons, kerosene, etc.) it is not essential that the organic material be soluble in mineral oil as long as it is soluble in the given reaction medium. Obviously, many organic materials which are soluble in mineral oils will be soluble in many of the other indicated suitable reaction mediums. It should be apparent that the reaction medium usually becomes the disperse medium of the colloidal disperse system or at least a component thereof depending on whether or not additional inert organic liquid is added as part of the reaction medium or the disperse medium.

Materials which can be overbased are generally oil-soluble organic acids including phosphorus acids, thiophosphorus acids, sulfur acids, carboxylic acids, thiocarboxylic acids, and the like, as well as the corresponding alkali and alkaline earth metal salts thereof. Representative examples of each of these classes of organic acids as well as other organic acids, e.g., nitrogen acids, arsenic acids, etc. are disclosed along with methods of preparing overbased products therefrom in the above cited patent and are, accordingly, incorporated herein by reference. U.S. Pat. No. 2,777,874 discloses organic acids suitable for preparing overbased materials which can be converted to disperse systems for use in the compositions of the invention. Similarly, U.S. Pat. Nos. 2,616,904; 2,695,910; 2,767,164; 2,767,209; 3,147,232; and 3,274,135 disclose a variety of organic acids suitable for preparing overbased materials as well as representative examples of overbased products prepared from such acids. Overbased acids wherein the acid is a phosphorus acid, a thiophosphorus acid, phosphorus acid-sulfur acid combination, and sulfur acid prepared from polyolefins are disclosed in U.S. Pat. Nos. 2,883,340; 2,915,517; 3,001,981; 3,108,960; and 3,232,883. Overbased phenates are disclosed in U.S. Pat. No. 2,959,551 while overbased ketones are disclosed in U.S. Pat. No. 2,798,852. A variety of overbased materials derived from oil-soluble metal-free, non-tautomeric neutral and basic organic polar compounds such as esters, amines, amides, alcohols, ethers, sulfides, sulfoxides, and the like are disclosed in U.S. Pat. Nos. 2,968,642; 2,971,014; and 2,989,463. Another class of materials which can be overbased are the oil-soluble, nitro-substituted aliphatic hydrocarbons, particularly nitro-substituted polyolefins such as polyethylene, polypropylene, polyisobutylene, etc. Materials of this type are illustrated in U.S. Pat. No. 2,959,551. Likewise, the oil-soluble reaction product of alkylene polyamines such as propylene diamine or N-alkylated propylene diamine with formaldehyde or formaldehyde producing compound (e.g., paraformaldehyde) can be overbased. Other compounds suitable for overbasing are disclosed in the above-cited patents or are otherwise well-known in the art.

The organic liquids used as the disperse medium in the colloidal disperse system can be used as solvents for the overbasing process.

The metal compounds used in preparing the overbased materials are normally the basic salts of metals in Group I-A and Group II-A of the Periodic Table although other metals such as lead, zinc, manganese, etc. can be used in the preparation of overbased materials. The anionic portion of the salt can be hydroxyl, oxide, carbonate, hydrogen carbonate, nitrate, sulfite, hydrogen sulfite, halide, amide, sulfate etc. as disclosed in the above-cited patents. Preferred overbased materials are prepared from the alkaline earth metal oxides, hydroxides, and alcoholates such as the alkaline earth metal oxides, hydroxides, and alcoholates such as the alkaline earth metal lower alkoxides. Preferred disperse systems of the invention are made from overbased materials containing calcium as the metal.

The promoters, that is, the materials which permit the incorporation of the excess metal into the overbased material, are also quite diverse and well known in the art as evidenced by the above-cited patents. A particularly comprehensive discussion of suitable promoters is found in U.S. Pat. Nos. 2,777,874; 2,695,910; and 2,616,904. These include the alcoholic and phenolic promoters. The alcoholic promoters include the alkanols of one to about 12 carbon atoms such as methanol, ethanol, amyl alcohol, octanol, isopropanol, and mixtures of these and the like. Phenolic promoters include a variety of hydroxy-substituted benzenes and naphthalenes. A particularly useful class of phenols are the alkylated phenols of the type listed in U.S. Pat. No. 2,777,874, e.g., heptylphenols, octylphenols, and nonylphenols. Mixtures of various promoters are sometimes used.

Suitable acidic materials are also disclosed in the above cited patents, for example, U.S. Pat. No. 2,616,904. Included within the known group of useful acidic materials are liquid acids such as formic acid, acetic acid, nitric acid, sulfuric acid, hydrochloric acid, hydrobromic acid, carbamic acid, substituted carbamic acids, etc. Acetic acid is a very useful acidic material although inorganic acidic materials such as HCl, $SO_2$, $SO_3$, $CO_2$, $H_2S$, $N_2O_3$, etc. are ordinarily employed as the acidic materials. Preferred acidic materials are carbon dioxide and acetic acid.

In preparing overbased materials, the material to be overbased, an inert non-polar organic solvent therefor, the metal base, the promoter and the acidic material are brought together and a chemical reaction ensues. The exact nature of the resulting overbased product is not known. However, it can be adequately described for purposes of the present specification as a single phase homogeneous mixture of the solvent and (1) either a metal complex formed from the metal base, the acidic material, and the material being overbased and/or (2) an amorphous metal salt formed from the reaction of the acidic material with the metal base and the material which is said to be overbased.

The temperature at which the acidic material is contacted with the remainder of the reaction mass depends to a large measure upon the promoting agent used. With a phenolic promoter, the temperature usually ranges from about 80° C. to about 300° C., and preferably from about 100° C. to about 200° C. When an alcohol or mercaptan is used as the promoting agent, the temperature usually will not exceed the reflux temperature of the reaction mixture and preferably will not exceed about 100° C.

In view of the foregoing, it should be apparent that the overbased materials may retain all or a portion of the promoter. That is, if the promoter is not volatile (e.g., an alkyl phenol) or otherwise readily removable from the overbased material, at least some promoter remains in the overbased product. Accordingly, the disperse systems made from such products may also contain the promoter. The presence or absence of the promoter in the overbased material used to prepare the disperse system and likewise, the presence or absence of the promoter in the colloidal disperse systems themselves does not represent a critical aspect of the invention. Obviously, it is within the skill of the art to select a volatile promoter such as a lower alkanol, e.g., methanol, ethanol, etc., so that the promoter can be readily removed prior to incorporation with the compositions of the present invention to forming the disperse system or thereafter.

A preferred class of overbased materials used as starting materials in the preparation of the disperse systems of the present invention are the alkaline earth metal-overbased oil-soluble organic acids, preferably those containing at least about 12 aliphatic carbons although the acids may contain as few as about 8 aliphatic carbon atoms if the acid molecule includes an aromatic ring such as phenyl, naphthyl, etc. Representative organic acids suitable for preparing these overbased materials are discussed and identified in detail in the above-cited patents. Particularly U.S. Pat. Nos. 2,616,904 and 2,777,874 disclose a variety of very suitable organic acids. Overbased oil-soluble carboxylic acid and sulfonic acids are particularly suitable. Illustrative of the carboxylic acids are palmitic acid, stearic acid, myristic acid, oleic cid, linoleic acid, behenic acid, hexatriacontanoic acid, tetrapropylene-substituted glutaric acid, polyisobutene (M.W.=5000)-substituted succinic acid, polypropylene, (M.W.=10,000)-substituted succinic acid, octadecyl-substituted adipic acid, chlorostearic acid, 9-methylstearic acid, dichlorostearic acid, stearylbenzoic acid, eicosane-substituted naphthoic acid, dilauryl-decahydro-naphthalene carboxylic acid, mixtures of these acids, their alkali and alkaline earth metal salts, and/or their anhydrides. Of the oil-soluble sulfonic acids, the mono-, di-, and tri-aliphatic hydrocarbon substituted aryl sulfonic acids are preferred. Illustrative examples of suitable sulfonic acids include monoeicosane-substituted naphthalene sulfonic acids dodecylbenzene sulfonic acids, didodecylbenzene sulfonic acids, dinonylbenzene sulfonic acids, cetylchlorobenzene sulfonic acids, dilauryl beta-naphthalene sulfonic acids, the sulfonic acid derived by the treatment of polyisobutene having a molecular weight of 1500 with chlorosulfonic acid, nitronaphthalenesulfonic acid, paraffin wax sulfonic acid, cetyl-cyclopentane, sulfonic acid, laurylcyclohexanesulfonic acids, polyethylene (M.W.=750) sulfonic acids, etc. Obviously, it is necessary that the size and number of aliphatic groups on the aryl sulfonic acids be sufficient to render the acids soluble. Normally the aliphatic groups will be alkyl and/or alkenyl groups such that the total number of aliphatic carbons is at least about 12.

Within this preferred group of overbased carboxylic and sulfonic acids, the barium and calcium overbased mono-, di-, and tri-alkylated benzene and naphthalene (including hydrogenated forms thereof), and higher fatty acids are especially preferred. Illustrative of the synthetically produced alkylated benzene and naphthalene sulfonic acids are those containing alkyl substituents having from about 8 to about 30 carbon atoms, preferably about 12 to about 30 carbon atoms, and advantageously about 24 carbon atoms. Such acids include di-isododecyl-benzene sulfonic acid, wax-substituted phenol sulfonic acid, wax-substituted benzene sulfonic acids, polybutene-substituted sulfonic acid, cetyl-chlorobenzene sulfonic acid, di-cetylnaphthalene sulfonic acid, di-lauryldiphenylether sulfonic acid, di-isononylbenzene sulfonic acid, di-isooctadecylbenzene sulfonic acid, stearylnaphthalene sulfonic acid, and the like. This especially preferred group of aliphatic fatty acids includes the saturated and unsaturated higher fatty acids containing from about 12 to about 30 carbon atoms. Illustrative of these acids are lauric acid, palmitic acid, oleic acid, linoletic acid, linolenic acid, oleostearic acid, stearic acid, myristic acid, and undecalinic acid, alpha-chlorostearic acid, and alpha-nitrolauric acid.

As shown by the representative examples of the preferred classes of sulfonic and carboxylic acids, the acids may contain nonhydrocarbon substituents such as halo, nitro, alkoxy, hydroxyl, and the like.

It is desirable that the overbased materials used to prepare the disperse system have a metal ratio of at least about 3.5 and preferably at least about 4.5. A preferred group of overbased materials has a metal ratio of at least about 7. While overbased materials having a metal ratio of up to about 75 can be used, normally the maximum metal ratio will not exceed about 30 and, in most cases, not more than about 20.

The overbased materials used in preparing the disperse systems utilized in the compositions of the invention generally contain from about 10% to about 70% by weight of metal-containing components. As explained hereafter, the exact nature of these metal containing components is not known. While not wishing to be bound by theory, it is believed that the metal base, the acidic material, and the organic material being overbased form a metal complex, this complex being the metal-containing component of the overbased material. On the other hand, it has also been theorized that the metal base and the acidic material form amorphous metal compounds which are dissolved in the inert organic reaction medium and the material which is said to be overbased. The material which is overbased may itself be a metal-containing compound, e.g., a carboxylic or sulfonic acid metal salt. In such a case, the metal containing components of the overbased material would be both the amorphous compounds and the acid salt. The remainder of the overbased materials consist essentially of the inert organic reaction medium and any promoter which is not removed from the overbased product. For purposes of this application, the organic material which is subjected to overbasing is considered a part of the metal-containing components. Normally, the liquid reaction medium constitutes at least about 30% by weight of the reaction mixture utilized to prepare the overbased materials.

As mentioned above, the colloidal disperse systems used in the composition of the present invention are prepared by homogenizing a "conversion agent" and the overbased starting material. Homogenization is achieved by vigorous agitation of the two components, preferably at the reflux temperature or a temperature slightly below the reflux temperature. The reflux temperature normally will depend upon the boiling point of the conversion agent. However, homogenization may be achieved within the range of about 25° C. to about 200° C. or slightly higher. Usually, there is no real advantage in exceeding about 150° C.

The concentration of the conversion agent necessary to achieve conversion of the overbased material is usually within the range of from about 1% to about 80% based upon the weight of the overbased material excluding the weight of the inert, organic solvent and any promoter present therein. Preferably at least about 10% and usually less than about 60% by weight of the conversion agent is employed. Concentrations beyond about 60% appear to afford no additional advantages.

The terminology "conversion agent" as used herein is intended to describe a class of very diverse materials which possess the property of being able to convert the Newtonian homogeneous, single-phase, overbased materials into non-Newtonian colloidal disperse systems. The mechanism by which conversion is accomplished is not completely understood. However, with the exception of carbon dioxide, these conversion agents all possess active hydrogens. The conversion agents include lower aliphatic carboxylic acids, water, aliphatic alcohols, cycloaliphatic alcohols, arylaliphatic alcohols, phenols, ketones, aldehydes, amines, boron acids, phosphorus acids, and carbon dioxide. Mixtures of two or more of these conversion agents are also useful. Particularly useful conversion agents are discussed below.

The lower aliphatic carboxylic acids are those containing less than about 8 carbon atoms in the molecule. Examples of this class of acids are formic acid, acetic acid, propionic acid, butyric acid, valeric acid, isovaleric acid, isobutyric acid, caprylic acid, heptanoic acid, chloroacetic acid, dichloroacetic acid, trichloroacetic acid, etc. Formic acid, acetic acid, and propionic acid, are preferred with acetic acid being especially suitable. It is to be understood that the anhydrides of these acids are also useful and, for the purposes of the specification and claims of this invention, the term acid is intended to include both the acid per se and the anhydride of the acid.

Useful alcohols include aliphatic, cycloaliphatic, and arylaliphatic mono- and polyhydroxy alcohols. Alcohols having less than about 12 carbons are especially useful while the lower alkanols, i.e., alkanols having less than about 8 carbon atoms are preferred for reasons of economy and effectiveness in the process. Illustrative are the alkanols such as methanol, ethanol, isopropanol, n-propanol, isobutanol, tertiary butanol, isooctanol, dodecanol, n-pentanol, etc.; cycloalkyl alcohols exemplified by cyclopenthanol, cyclohexanol, 4-methylcyclohexanol, 2-cyclohexylethanol, cyclopentylmethanol, etc.; phenyl aliphatic alkanols such as benzyl alcohol, 2-phenylethanol, and cinnamyl alcohol; alkylene glycols of up to about 6 carbon atoms and mono-lower alkyl ethers thereof such as monomethylether of ethylene glycol, diethylene glycol, ethylene glycol, trimethylene glycol, hexamethylene glycol, triethylene glycol, 1,4-butanediol, 1,4-cyclohexanediol, glycerol, and pentaerythritol.

The use of a mixture of water and one or more of the alcohols is especially effective for converting the overbased material to colloidal disperse systems. Such combinations often reduce the length of time required for the process. Any water-alcohol combination is effective but a very effective combination is a mixture of one or more alcohols and water in a weight ratio of alcohol to water of from about 0.05:1 to about 24:1. Preferably, at least one lower alkanol is present in the alcohol component of these water-alkanol mixtures. Water-alkanol mixtures wherein the alcoholic portion is one or more lower alkanols are especially suitable.

Phenols suitable for use as conversion agents include phenol, naphthol, ortho-cresol, para-cresol, catechol, mixtures of cresol, para-tert-butylphenol, and other lower alkyl substituted phenols, metapolyisobutene (M.W.-350)-substituted phenol, and the like.

Other useful conversion agents include lower aliphatic aldehydes and ketones, particularly lower alkyl aldehydes and lower alkyl ketones such as acetaldehydes, propionaldehydes, butyraldehydes, acetone, methylethyl ketone, diethyl ketone. Various aliphatic, cycloaliphatic, aromatic, and heterocyclic amines are also useful providing they contain at least one amino group having at least one active hydrogen attached thereto. Illustrative of these amines are the mono- and di-alkylamines, particularly mono- and di-lower alkylamines, such as methylamine, ethylamine, propylamine, dodecylamine, methyl ethylamine, diethylamine; the cycloalkylamines such as cyclohexylamine, cyclopentylamine, and the lower alkyl substituted cycloalkylamines such as 3-methylcyclohexylamine; 1,4-cyclohexylenediamine; arylamines such as aniline, mono-, di-, and tri-, lower alkyl-substituted phenyl amines, naphthylamines, 1,4-phenylene diamines; lower alkanol amines such as ethanolamine and diethanolamine; alkylenediamines such as ethylene diamine, triethylene tetramine, propylene diamines, octamethylene diamines; and heterocyclic amines such as piperazine, 4-aminoethylpiperazine, 2-octadecyl-imidazoline, and oxazolidine. Boron acids are also useful conversion agents and include boronic acids (e.g., alkyl-B(OH)$_2$ or aryl-B(OH$_2$)), boric acid (i.e., H$_3$BO$_3$), tetraboric acid, metaboric acid, and esters of such boron acids.

The phosphorus acids are useful conversion agents and include the various alkyl and aryl phosphinic acids, phosphinus acids, phosphonic acids, and phosphonous acids. Phosphorus acids obtained by the reaction of lower alkanols or unsaturated hydrocarbons such as polyisobutenes with phosphorus oxides and phosphorus sulfides are particularly useful, e.g., P$_3$O$_5$ and P$_2$S$_5$.

Carbon dioxide can be used as the conversion agent. However, it is preferable to use this conversion agent in combination with one or more of the foregoing conversion agents. For example, the combination of water and carbon dioxide is particularly effective as a conversion agent for transforming the overbased materials into a colloidal disperse system.

As previously mentioned, the overbased materials are single phase homogeneous systems. However, depending on the reaction conditions and the choice of reactants in preparing the overbased materials, there sometimes are present in the product insoluble contaminants. These contaminants are normally unreacted basic materials such as calcium oxide, barium oxide, calcium hydroxide, barium hydroxide, or other metal base materials used as a reactant in preparing the overbased material. It has been found that a more uniform colloidal disperse system results if such contaminants are removed prior to homogenizing the overbased material with the conversion agents. Accordingly, it is preferred that any insoluble contaminants in the overbased materials be removed prior to converting the material in the colloidal disperse system. The removal of such contaminants is easily accomplished by conventional techniques such as filtration or centrifugation. It should be understood, however, that the removal of these contaminants, while desirable for reasons just mentioned, is not an absolute essential aspect of the invention and useful products can be obtained when overbased materials containing insoluble contaminants are converted to the colloidal disperse systems.

The conversion agents or a proportion thereof may be retained in the colloidal disperse system. The conversion agents are however, not essential components of these disperse systems and it is usually desirable that as little of the conversion agents as possible be retained in the disperse systems. Since these conversion agents do not react with the overbased material in such a manner as to be permanently bound thereto through some type of chemical bonding, it is normally a simple matter to remove a major proportion of the conversion agents and, generally, substantially all of the conversion agents. Some of the conversion agents have physical properties which make them readily removable from the disperse systems. Thus, most of the free carbon dioxide gradually escapes from the disperse system during the homogenization process or upon standing thereafter. Since the liquid conversion agents are generally more volatile than the remaining components of the disperse system, they are readily removalbe by conventional devolatilization techniques, e.g., heating, heating at reduced pressures, and the like. For this reason, it may be desirable to select conversion agents which will have boiling points which are lower than the remaining components of the disperse system. This is another reason why the lower alkanols, mixtures thereof, and lower alkanol-water mixtures are preferred conversion agents.

Again, it is not essential that all of the conversion agent be removed from the disperse system. In fact, useful disperse systems for employment in the compositions of the invention result without removal of the conversion agents. However, from the standpoint of achieving uniform results, it is generally desirable to remove the conversion agents, particularly where they are volatile. In some cases, the liquid conversion agents may facilitate the mixing of the colloidal disperse system with the other components of the compositions of the invention. In such cases, it is advantageous to permit the conversion agents to remain in the disperse system until it is mixed with such components. Thereafter, the conversion agents can be removed from such compositions by conventional devolatilization techniques if desired.

The disperse systems are characterized by three essential components: (1) solid, metal-containing particles formed in situ, (2) an inert, non-polar, organic liquid which functions as the disperse medium, and (3) an organic compound which is soluble in the disperse medium and the molecules of which are characterized by a hydrophobic portion and at least one polar substituent. In a preferred system component (1) comprises solid calcium carbonate colloidal particles having a unit particle size in the range of about 50 A to about 300 A; component (2) is an aromatic solvent; and component (3) represented by the formula

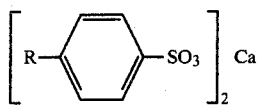

wherein R is a hydrocarbyl group having an average of about 12 to about 30 carbon atoms, preferably about 20 to about 28 carbon atoms, more preferably about 24 carbon atoms. The molar ratio of (1) to (3) preferably ranges up to about 20.

The solid, metal-containing particles formed in situ possess the same chemical composition as would the reaction products of the metal base and the acidic material used in preparing the overbased materials. Thus, the actual chemical identity of the metal containing particles formed in situ depends upon both the particular metal base or bases employed and the particular acidic material or materials reacted therewith. For example, if the metal base used in preparing the overbased material were barium oxide and if the acidic material was a mixture of formic and acetic acids, the metal-containing particles formed in situ would be barium formates and barium acetates.

However, the physical characteristics of the particles formed in situ in the conversion step are quite different from the physical characteristics of any particles present in the homogeneous, single-phase overbased material which is subjected to the conversion. Particularly, such physical characteristics as particle size and structure are quite different. The solid, metal-containing particles of the colloidal disperse systems are of a size sufficient for detection by X-ray diffraction. The overbased material prior to conversion are not characterized by the presence of these detectable particles.

X-ray diffraction and electron microscope studies have been made of both overbased organic materials and colloidal disperse systems prepared therefrom. These studies establish the presence in the disperse systems of the solid metal-containing salts. For example, in one disperse system that has been prepared, calcium carbonate is present as solid calcium carbonate having a particle size of about 40 to 50 A. (unit particle size) and interplanar spacing (dA.) of 3.035. But X-ray diffraction studies of the overbased material from which it was prepared indicate the absence of calcium carbonate of this type. In fact, calcium carbonate present as such, if any, appears to be amorphous and in solution. While not wishing to be bound by theory, it appears that conversion permits particle formation and growth. That is, the amorphous, metal-containing apparently dissolved salts or complexes present in the overbased material form solid, metal-containing particles which by a process of particle growth become colloidal particles. In many cases, these particles apparently are crystallites. Regardless of the correctness of the postulated mechanism for in situ particle formation the fact remains that no particles of the type predominant in the disperse systems are found in the overbased materials from which they are prepared. Accordingly, they are unquestionably formed in situ during conversion.

As these solid metal-containing particles formed in situ come into existence, they do so as pre-wet, pre-dispersed solid particles which are inherently uniformly distributed throughout the other components of the disperse system. The liquid disperse medium containing these pre-wet dispersed particles is readily incorporated into the compositions of the invention thus facilitating the uniform distribution of the particles throughout such compositions. This pre-wet, pre-dispersed character of the solid metal-containing particles resulting from their in situ formation is, thus, an important feature of the disperse systems.

In the foregoing preferred system, the third component of the disperse system (i.e., the organic compound which is soluble in the disperse medium and which is characterized by molecules having a hydrophobic portion and a polar substituent) is a calcium sulfonate of the formula

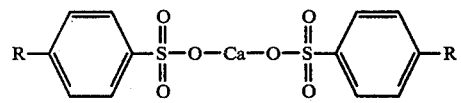

wherein R is a hydrocarbyl group of about 12 to about 30 carbon atoms, preferably about 20 to about 28 carbon atoms, more preferably about 24 carbon atoms. In this case, the hydrophobic portion of the molecule is the hydrocarbon moiety, i.e.,

The polar substituent is the metal salt moiety,

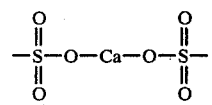

The hydrophobic portion of the organic compound is generally a hydrocarbyl group or a substantially hydrocarbyl group containing at least about 12 aliphatic carbon atoms. Usually the hydrocarbon portion is an aliphatic or cycloaliphatic hydrocarbyl group although aliphatic or cycloaliphatic substituted aromatic hydrocarbyl groups are also suitable. In other words, the hydrophobic portion of the organic compound is the residue of the organic material which is overbased minus its polar substituents. For example, if the material to be overbased is a carboxylic acid, sulfonic acid, or phosphorus acid, the hydrophobic portion is the residue of these acids which would result from the removal of the acid functions. Similarly, if the material to be overbased is a phenol, a nitro-substituted polyolefin, or an amine, the hydrophobic portion of the organic compound is the radical resulting from the removal of the hydroxyl, nitro, or amino group respectively. It is the hydrophobic portion of the molecule which renders the organic compound soluble in the solvent used in the overbasing process and later in the disperse medium.

Obviously, the polar portion of these organic compounds are the polar substituents such as the acid salt moiety discussed above. When the material to be overbased contains polar substituents which will react with the basic metal compound used in overbasing, for example, acid groups such as carboxy, sulfino, hydroxysulfonyl, and phosphorus acid groups or hydroxyl groups, the polar substituent of the third component is the polar group formed from the reaction. Thus, the polar substituent is the corresponding acid metal salt group of hydroxyl group metal derivative, e.g., an alkali or alkaline earth metal sulfonate, carboxylate, sulfinate, alcoholate, or phenate.

On the other hand, some of the materials to be overbased contain polar substituents which ordinarily do not react with metal bases. These substituents include nitro, amino, ketocarboxyl, carboalkoxy, etc. In the disperse systems derived from overbased materials of this type the polar substituents in the third component are unchanged from their identity in the material which was originally overbased.

The identity of the third essential component of the disperse system depends upon the identity of the starting material (i.e., the material to be overbased and the metal base compound) used in preparing the overbased material. Once the identity of these starting materials is known, the identity of the third component in the colloidal disperse system is automatically established. Thus, from the identity of the original material, the identity of the hydrophobic portion of the third component in the disperse system is readily established as being the residue of that material minus the polar substituents attached thereto. The identity of the polar substituents on the third component is established as a matter of chemistry. If the polar groups on the material to be overbased undergo reaction with the metal base, for example, if they are acid functions, hydroxy groups, etc., the polar substituent in the final product will correspond to the reaction product of the original substituent and the metal base. On the other hand, if the polar substituent in the material to be overbased is one which does not react with metal bases, then the polar substituent of the third component is the same as the original substituent.

As previously mentioned, this third component can orient itself around the metal-containing particles to form micellar colloidal particles. Accordingly, it can exist in the disperse system as an individual liquid component dissolved in the disperse medium or it can be associated with the metal-containing particles as a component of micellar colloidal particles.

In the preparation of the compositions of the invention it is essential to reduce the basicity of the non-Newtonian colloidal disperse system sufficiently to provide acceptable shelf life. The basicity of the disperse system is preferably adjusted with a suitable acidic material (e.g., sulfonic acid, carbon dioxide, etc.). The amount of acidic material employed in the preparation of the disperse system will be that amount sufficient to reduce the neutralization base number of the final disperse system to about 3 or less, preferably about 1 or less when referenced against a phenolphthalein indicator. A particularly preferred disperse system will be that having a neutralization base number of about zero.

Examples 1-3 illustrate the preparation of a colloidal disperse system which is useful in preparing the compositions of the invention. Unless otherwise indicated, "percentages" and "parts" refer to percent by weight and parts by weight. Where temperatures exceed the boiling points of the components of the reaction mixture, reflux conditions are employed unless the reaction products are being heated to remove volatile components.

EXAMPLE 1

3185 parts of methanol, 28.25 parts of calcium chloride and 226.5 parts of tap water are added to a glass-lined reactor equipped with a heating mantle, thermocouple, metal stirrer, gas inlet tube and condenser. The mixture is heated to 48° C. with stirring. 644.5 parts of Silo lime (94% calcium hydroxide) are added to the mixture to provide a slurry. The temperature of the mixture is reduced to 45° C. 7075 parts of polypropylene (MW=337) substituted benzene sulfonic acid are added to the mixture over a period of one hour. The temperature of the mixture exotherms to 46° C. The mixture is stirred for one-half hour. 6275 parts of SC Solvent 100 (a high-boiling alkylated aromatic solvent supplied by Ohio Solvents) are added to the mixture and the mixture is stirred for 15 minutes. Three increments of 1772.75 parts of Silo lime are added to the mixture. Carbon dioxide at a rate of five standard cubic feet per hour is bubbled through the mixture after each increment. Total blowing with carbon dioxide is approximately 10.5 hours with the temperature of the mixture varying from 40° C. to 50° C. The mixture is stripped with nitrogen blowing at a rate of two standard cubic feet per hour while heating to reflux over a nine-hour period, the temperature increasing over said period from 47° C. to 160° C. The mixture is cooled to room temperature. The mixture is filtered through a Gyro Tester clarifier. The solids content is adjusted to 70% solids with SC Solvent 100.

EXAMPLE 2

15,000 parts of the product of Example 1 are placed in a glass-lined reactor equipped with a heating mantle, thermocouple, gas inlet tube, condenser and metal stirrer, and heated to 40° C. with stirring. Carbon dioxide is bubbled through the mixture at a rate of one cubic foot per hour for 3.75 hours, the temperaure of the mixture varying from 38° C. to 46° C. during the carbon dioxide blowing. 847.8 parts of isopropyl alcohol, 847.8 parts of methanol and 1304 parts of distilled water are added to the mixture over a five-minute period. The mixture exotherms to 45° C., and is then heated to 67° C. 2500 parts of SC Solvent 100 are added to the mixture. The mixture is heated to 78° C. and maintained at said temperature for 0.5 hour. The mixture is stripped by bubbling nitrogen at a rate of two standard cubic feet per hour through the mixture over a period of 5.5 hours, the temperature of the mixture increasing from 77° C. to 155° C. during stripping. The mixture is cooled with cooling water, and 16,700 parts of a gelled product having a solids content of 62.5% by weight are obtained.

EXAMPLE 3

1200 parts of the product of Example 2 are placed in a resin reactor equipped with a heating mantle, metal stirrer, teflon bearing, gas inlet tube, thermocouple, trap and condenser. 225.5 parts of polypropylene (MW=337) substituted benzene sulfonic acid are added to the mixture over a 10-minute period, and the mixture exotherms to 34° C. The temperature of the mixture is maintained at 34° C. for 20 minutes. Water is stripped from the mixture by bubbling nitrogen at a rate of two standard cubic feet per hour through the mixture. The trap is filled with SC Solvent 100 to prevent solvent loss. The temperature increases to 162° C. over a two-hour period during stripping. The temperature is then maintained at 162° C. for 0.5 hour. 7.5 cubic centimeters of water are collected. The mixture is cooled to room temperature, and 1413 parts of a low oil overbased sulfonate gel with a zero base number are obtained.

The Cross-Linkable Material (B)

The cross-linkable material can be any cross-linkable polymer or oligomer other than an isocyanate. These materials can be self cross-linking, cross-linkable with other cross-linkable materials or cross-linkable with a cross-linking agent.

The cross-linkable material is typically a polyfunctional material containing hydroxy groups, carboxy groups, alkoxy groups, primary amine groups, secondary amine groups, epoxy groups, or a mixture of two or more of said groups.

The cross-linkable material can be a mixture of cross-linkable materials that are cross-linkable with each other. In one embodiment of the invention, the cross-linkable material can be a mixture of at least one polyfunctional material containing hydroxy groups and at least one polyfunctional material containing alkoxy groups. In another embodiment, it can be a mixture of at least one polyfunctional material containing hydroxy groups and at least one polyfunctional material containing carboxy groups. In still another embodiment, it can be a mixture of at least one polyfunctional material containing epoxy groups and at least one polyfunctional material containing carboxy groups. In another embodiment, it can be a mixture of at least one polyfunctional material containing carboxy groups and at least one polyfunctional material containing alkoxy groups. In yet another embodiment, it can be a mixture of at least one polyfunctional material containing epoxy groups and at least one polyfunctional material containing alkoxy groups. In the foregoing mixtures, the cross-linkable materials are cross-linkable with each other and thus the use of a cross-linking agent (C) is not necessary, although such a cross-linking agent can also be used to increase the cross-linking reaction.

The cross-linking reaction can be, for example, a reaction between a hydroxyl group and an alkoxyl group, reaction between a hydroxyl group and carboxyl group, reaction between a carboxyl group and epoxy group, self cross-linking reaction of an alkoxyl group, reaction between a carboxyl group and an alkoxy group, or reaction between an epoxy group and an alkoxyl group.

The cross-linkable material is preferably a thermosetting resin having a number average molecular weight of at least about 300, preferably about 500 to about 50,000, more preferably about 1000 to about 10,000. Among the preferred cross-linkable materials are epoxy resins, acrylic resins, unsaturated polyester resins, alkyd resins, amino resins, phenolic resins, allyl resins, furan resins, silicone resins, or a mixture of two or more of said resins.

The epoxy resins useful in the present invention include any one of a number of well-known organic resins which are characterized by the presence therein of the epoxide group

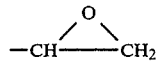

A wide variety of such resins are available commercially. Such resins have either a mixed aliphatic-aromatic or an exclusively non-benzenoid (i.e., aliphatic or cycloaliphatic) molecular structure.

The mixed aliphatic-aromatic epoxy resins which are useful with the present invention are prepared by the well-known reaction of a bis(hydroxy-aromatic)alkane or a tetrakis-(hydroxyaromatic)-alkane with a halogen-substituted aliphatic epoxide in the presence of a base such as, e.g., sodium hydroxide or potassium hydroxide. Under these conditions, hydrogen halide is first eliminated and the aliphatic epoxide group is coupled to the aromatic nucleus via an ether linkage. Then the epoxide groups condense with the hydroxyl groups to form polymeric molecules which vary in size according to the relative proportions of reactants and the reaction time. The following equations, using for purposes of illustration, epichlorohydrin and 2,2-bis-(p-hydroxyphenyl)propane as reactants, while not necessarily representing all reactions, are believed to represent some of the principal reactions which occur.

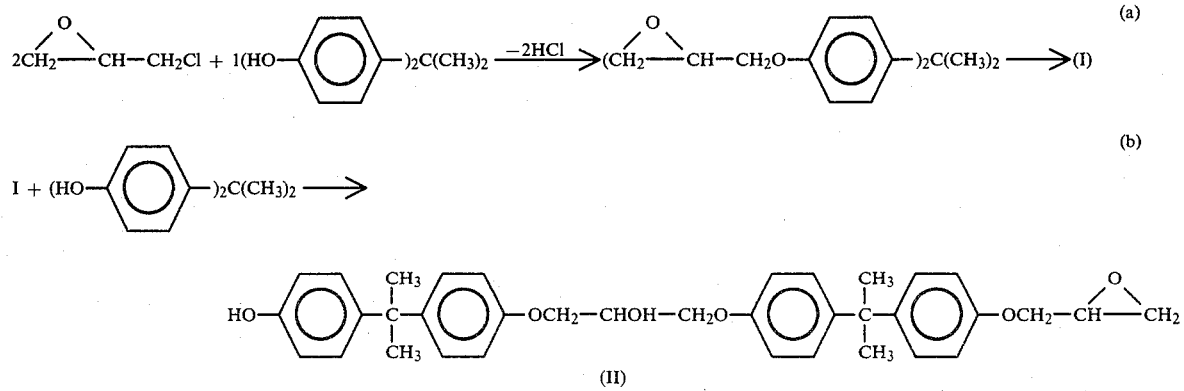

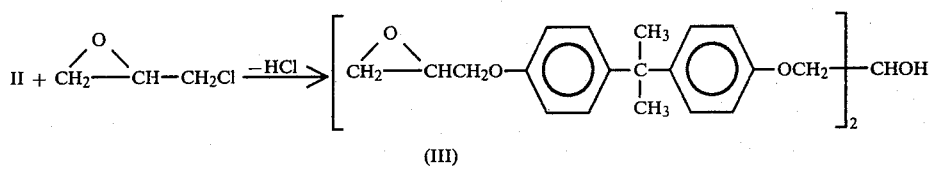

(d) III may likewise condense with additional epichlorohydrin and 2,2-bis-(p-hydroxyphenyl)propane to form higher polymers of the postulated general structure:

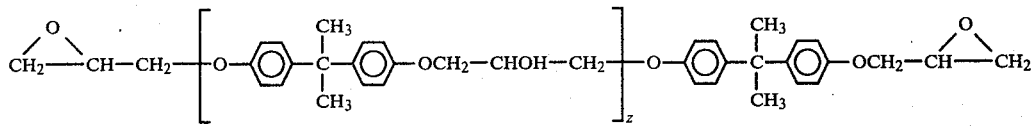

wherein z is an integer representing the number of repeat or monomer units in the polymer chain.

In lieu of the epichlorohydrin, one can use halogen-substituted aliphatic epoxides containing about 4 or more carbon atoms, generally about 4 to about 20 carbon atoms. In general, it is preferred to use a chlorine substituted terminal alkylene oxide (terminal denoting that the epoxide group is on the end of the alkyl chain) and a particular preference is expressed for epichlorohydrin by reason of its commercial availability and excellence in forming epoxy resins useful for the purpose of this invention.

If desired, the halogen substituted aliphatic epoxide may also contain substituents such as, e.g., hydroxy keto, nitro, nitroso, ether, sulfide, carboalkoxy, etc.

Similarly, in lieu of the 2,2-bis-(p-hydroxyphenyl)-propane, one can use bis-(hydroxyaromatic)alkanes containing about 16 or more carbon atoms, generally about 16 to about 30 carbon atoms such as, e.g., 2,2-bis-(1-hydroxy-4-naphthyl)-propane; 2,2-bis-(o-hydroxyphenyl)propane; 2,2-bis-(p-hydroxyphenyl)butane, 3,3-bis-p-hydroxyphenyl)hexane; 2-(p-hydroxyphenyl)-4-(1-hydroxy-4-naphthyl)octane, 5-5-bis-(p-hydroxy-o-methylphenyl)-decane, bis-(p-hydroxyphenyl)methane, 2,2-bis-(p-hydroxy-o-isopropylphenyl)propane, 2,2-bis-(o,p-dihydroxyphenyl)propane, 2-(p-hydroxyphenyl)-5-(o-hydroxyphenyl)hexadecane, and the like. If desired, the bis-(hydroxyaromatic)alkane may contain substituents such as, e.g., halogen, nitro, nitroso, ether, sulfide, carboalkoxy, etc. In general, it is preferred to use a bis-(p-hydroxyphenyl)alkane since compounds of this type are readily available from the well-known condensation of phenols with aliphatic ketones or aldehydes in the presence of a dehydrating agent such as sulfuric acid. Particularly preferred is 2,2-bis-(p-hydroxyphenyl)propane, which is available commercially as "Bisphenol A".

Epoxy resins which are especially suited for the purpose of the present invention are prepared by the reaction of bis-(hydroxyphenyl)alkane, preferably 2,2-bis-(p-hydroxyphenyl)propane with a chlorine substituted terminal alkylene oxide, preferably epichlorohydrin, to produce a product having an average molecular weight within the range of about 300 to about 500 and preferably about 350 to about 400. One of such preferred epoxy resins having an average molecular weight of about 380 and prepared from 2,2-bis-(p-hydroxyphenyl)propane and epichlorohydrin is known by the trade designation "Epon 820". A related type of epoxy resin having an average molecular weight of about 616 and prepared from epichlorohydrin and symmetrical tetrakis-(p-hydroxyphenyl)ethane is available under the trade designation "Epon 1031".

Another general class of epoxy resins which are useful for the purpose of the present invention are the aliphatic or cycloaliphatic epoxy resins. These resins, which are cyclic or acyclic olefins such as, e.g., methylcyclohexane, vinylcyclohexene, alphamethyl-vinylcyclohexene, polybutadiene, etc., which contain at least one carbon-to-carbon multiple bond. One of such non-benzenoid epoxy resins, known by the trade designation "Oxiron 2001", is made by oxidizing polybutadiene with peracetic acid.

Still another class of epoxy resins which are useful for the purposes of the present invention are the novolak resins. Representative of the novolak resins are the phenol novolak and cresol novolak resins illustrated respectively by the following general structure.

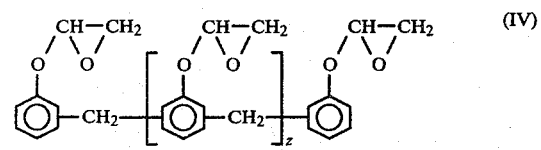

and

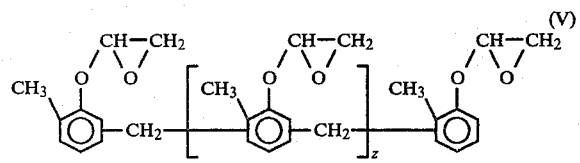

The acrylic resins are obtained by polymerizing a suitable combination of a functional group-containing monomer and another copolymerizable monomer in an ordinary manner. The polymerization temperature is ordinarily between about 60° C. and about 100° C., and polymerization time is usually within a range of about 3 to about 10 hours. Examples of the functional group-containing monomers include hydroxyl group-containing monomers such as beta-hydroxyethyl acrylate, beta-hydroxypropyl acrylate, beta-hydoxyethyl methacrylate, beta-hydroxypropyl methacrylate, N-methylol acrylamide and N-methylol methacrylamide; carboxyl group-containing monomers such as acrylic acid, methacrylic acid, itaconic acid, maleic acid, fumaric acid, as well as monoesters of maleic acid and fumaric acid with monoalcohols; alkoxyl group-containing monomers such as N-butoxy-methylmethacrylamide and N-butoxymethylacrylamide; and epoxy group-containing monomers such as glycidyl methacrylate, glycidyl acrylate and allyl glycidyl ether. These monomers may be used either alone or in the form of a combination of two or more of them. The functional group-containing monomer is used in an amount of about 5 to about 40% by weight of total monomers. Examples of the monomers copolymerized with these functional group-containing monomers include olefinically unsaturated monomers such as ethylene, propylene and isobutylene; aromatic monomers such as styrene, vinyltoluene and alpha-methylstyrene; ester of (meth)acrylic acid and alcohols of 1 to about 18 carbon atoms such as methyl(meth)acrylate, ethyl(meth)acrylate, propyl(meth)acrylate, n-butyl(meth)acrylate, isobutyl(meth)acrylate, cyclohexyl(meth)acrylate, 2-ethylhexyl(meth)acrylate and lauryl(meth)acrylate; vinyl esters of carboxylic acid of about 2 to about 11 carbon atoms such as vinyl acetate, vinyl propionate and vinyl 2-ethylhexylic acid; as well as vinyl chloride, acrylonitrile and methacrylonitrile. They may be used either alone or in the form of a mixture of two or more of them.

The unsaturated polyesters are characterized by vinyl unsaturation in the polyester backbone. These unsaturated polyesters are obtained by polymerizing polycarboxylic acids or anhydrides with polyhydric alcohols using known methods. Examples of the polycarboxylic acids include terepthalic acid, isophthalic acid, phthalic anhydride, hexahydrophthalic anhydride, fumaric acid, trimellitic anhydride, maleic anhydride, phthalic anhydride, and succinic anhydride. Examples of the polyhydric alcohols include ethylene glycol, propylene glycol, diethylene glycol, glycerol, trimethylol propane, trimethylol ethane, pentaerythritol and bisphenol A.

The alkyd resins are obtained by reacting a dihydric or polyhydric alcohol and a polybasic acid or anhydride in the presence of a drying oil using known techniques. Examples of the dihydric or polyhydric alcohols include glycerol, pentaerythritol, sorbitol and diethylene glycol. Examples of the polybasic acids or anhydrides include phthalic acid, isophthalic acid, maleic anhydride, fumaric anhydride, nonconjugated linoleic acid, oleic acid, adipic acid, azelaic acid, sebacic acid, tetrachlorophthalic anhydride, and chlorendic anhydride. Examples of the drying oils include soybean oil, linseed oil, dehydrated castor oil, non-oxidizing castor and coconut oils, tung oil, oiticica oil, fish oil, sunflower oil, walnut oil, safflower seed oil and tall oil. These alkyd resins may be produced, for example, by direct fusion of glycerol, phthalic anhydride and drying oil at a temperature in the range of from about 210° C. to about 235° C. Solvents are then added to adjust the solids content. The amount of drying oil varies depending on the intended use. With respect to the high solids compositions of the invention, the level of drying oil is preferably minimized.

The amino resins (sometimes referred to as polyalkylene amides) are nitrogen-rich polymers containing nitrogen in the amino form, $NH_2$. The starting amino-bearing material is usually reacted with an aldehyde (e.g., formaldehyde) to form a reactive monomer, which is then polymerized to a thermosetting resin. Examples of amino-bearing materials include urea, melamine, copolymers of both with formaldehyde, thiourea, aniline, dicyanodiamide, toluene sulfonamide, benzoguanamine, ethylene urea and acrylamide. Preferred amino resins are the melamine-formaldehyde and urea-formaldehyde resins.

The phenolic resins are any of the several types of synthetic thermosetting resins made by reacting a phenol with an aldehyde. Examples of the phenols include phenol, cresols, xylenols, p-t-butyl phenol, p-phenyl phenol, bis-phenols and resorcinol. Examples of the aldehydes include formaldehyde, acetaldehyde and furfural. Phenol-formaldehyde resins are a preferred class of such phenolic resins.

The allyl resins are formed by the addition polymerization of compounds containing the group $CH_2=CHCH_2$, such as esters of allyl alcohol and dibasic acids. Generally, they are commercially available as monomers and partially polymerized prepolymers. Examples of such allyl resins include diallyl phthalate, diallyl isophthalate, diallyl maleate and diallyl chlorendate.

The furan resins are obtained primarily by the condensation polymerization of furfuryl alcohol in the presence of strong acids, sometimes in combination with formaldehyde or furfurylaldehyde. These furan resins also include resins made by condensing phenol with furfuryl alcohol or furfuryl, and furfuryl-ketone polymers.

The silicone resins are a family of semiorganic polymers comprising chains of alternating silicon and oxygen atoms, modified with various organic groups attached to the silicon atoms. Examples of such silicone resins include dimethyl polysiloxanes made by treating silicon with methyl chloride in the presence of a catalyst to form a chlorosilane, hydrolyzing this chlorosilane to form a cyclic trimer of siloxane, then polymerizing the siloxane to form a dimethyl polysiloxane. Modifications of dimethyl polysiloxane that are useful include those made by the incorporation of phenyl groups, halogen atoms, alkyds, epoxides, polyesters and other organic compounds containing OH groups.

The Cross-Linking Agent (C)

The cross-linking agents used herein can be any cross-linking agent that is reactive with the functional groups of the cross-linkable material (B). When component (B) is self-cross-linking or is cross-linked with another cross-linkable material, the use of cross-linking agent (C) is not necessary. Thus the cross-linking agent is an optional ingredient in the compositions of the invention.

Useful cross-linking agents have from 2-6 reactive sites per molecule. Preferred cross-linking agents are oligomers or resins which are the products of the reaction of formaldehyde with melamine or with urea. Either melamine or urea resins (or mixtures thereof) may be used as the cross-linking agents, although the melamines generally provide a greater degree of cross-linking. Useful melamine and urea resins are the alkoxy alkyl and the alkylol melamines and ureas. Specific examples include: alkoxymethyl melamines and ureas in which the alkoxy groups have 1-4 carbon atoms such as hexaalkoxy (methoxy, ethoxy, propoxy, butoxy and mixed alkoxy) methyl melamines and dialkoxy methyl ureas; and the alkylol melamines and ureas such as hexamethylol melamine and dimethylol urea. These cross-linking agents are particularly useful when the cross-linkable material (B) is an alkyd resin, a polyester resin, an epoxy resin or an acrylic resin.

Other cross-linking agents that are useful are the polyfunctional acids and anhydrides, polyfunctional amines and polyhydric alcohols.

The polyfunctional acids or anhydrides include those materials containing two or more equivalents of a carboxyl group or acid anhydride thereof in the molecule. Examples include polyvalent carboxylic acid or anhydride compounds such as phthalic anhydride, isophthalic acid, adipic acid, succinic acid, sebacic acid, citric acid, itaconic acid, aconitic acid, maleic anhydride, fumaric acid, trimellitic anhydride, hexahydrophthalic acid, tetrahydrophthalic anhydride, dodecenyl succinic anhydride, pimelic acid, pyromellitic anhydride, and polyester resins having two or more carboxyl groups in the molecule which are obtained by esterification of these polyvalent carboxylic acid compounds with polyhydric alcohols.

The polyfunctional amines include those compounds which contain two or more nitrogen atoms having one or two active hydrogen atoms adjacent thereto in the molecule. These polyfunctional amines can be aliphatic, cycloaliphatic, heterocyclic or aromatic polyamines.

Among the heterocyclic polyamines are aziridines, azetidines, azolidines, tetra- and di-hydro pyridines, pyrroles, indoles, piperidines, imidazoles, di- and tetrahydroimidazoles, piperazines, isoindoles, purines, morpholines, thiomorpholines, N-aminoalkylmorpholines, N-aminoalkylthiomorpholines, N-aminoalkylpiperazines, N,N'-di-aminoalkylpiperazines, azepines, azocines, azonines, azecines and tetra-, di- and perhydro derivatives of each of the above and mixtures of two or more of these heterocyclic amines. Preferred heterocyclic amines are the saturated 5- and 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkyl-substituted piperidines, piperazine, aminoalkyl-substituted piperazines, morpholine, aminoalkyl-substituted morpholines, pyrrolidine, and aminoalkyl-substituted pyrrolidines, are especially preferred. Usually the aminoalkyl substituents are substituted on a nitrogen atom forming part of the hetero ring. Specific examples of such heterocyclic amines include N-aminopropylmorpholine, N-aminoethylpiperazine, and N,N'-di-aminoethylpiperazine.

Hydroxyamines both mono- and polyamines are also useful provided they contain at least one primary or secondary amino group. The hydroxy-substituted amines contemplated are those having hydroxy substituents bonded directly to a carbon atom other than a carbonyl carbon atom; that is, they have hydroxy groups capable of functioning as alcohols. Examples of such hydroxy-substituted amines include ethanolamine, di-(3-hydroxypropyl)-amine, 3-hydroxybutyl-amine, 4-hydroxybutyl-amine, diethanolamine, di-(2-hydroxypropyl)-amine, N-(hydroxypropyl)-propylamine, N-(2-hydroxyethyl)-cyclohexylamine, 3-hydroxycyclopentylamine, para-hydroxyaniline, N-hydroxyethyl piperazine, and the like.

Hydrazine and substituted-hydrazine can also be used as the cross-linking agent. Both of the nitrogens in the hydrazine used must contain a hydrogen directly bonded thereto. The substituents which may be present on the hydrazine include alkyl, alkenyl, aryl, aralkyl, alkaryl, and the like. Usually, the substituents are alkyl, especially lower alkyl, phenyl, and substituted phenyl such as lower alkoxy substituted phenyl or lower alkyl substituted phenyl. Specific examples of substituted hydrazines are methylhydrazine, N,N'-dimethylhydrazine, phenylhydrazine, N-phenyl-N'-ethyl-hydrazine, N,N'-di(parachlorophenol)-hydrazine, N-phenyl-N'-cyclohexylhydrazine, and the like.

Another group of amines suitable for use as the cross-linking agent are branched polyalkylene polyamines. The branched polyalkylene polyamines are polyalkylene polyamines wherein the branched group is a side chain containing on the average at least one nitrogen-bonded aminoalkylene

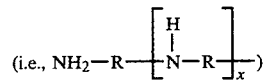

group per nine amino units present on the main chain, for examples, 1–4 of such branched chains per nine units of the main chain, but preferably one side chain unit per nine main chain units. Thus, these polyamines contain at least three primary amino groups and at least one tertiary amino group.

These agents may be expressed by the formula

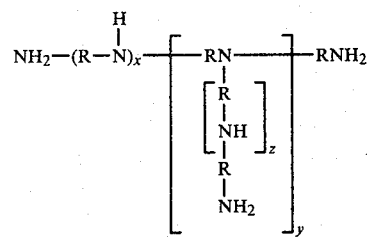

wherein R is an alkylene group such as ethylene, propylene, butylene and other homologues (both straight chained and branched), etc., but preferably ethylene; and x, y and z are integers, x being, for example, from 4 to 24 or more, but preferably 6 to 18, y being, for example, 1 to 6 or more, but preferably 1 to 3, and z being, for example, 0 to 6, but preferably 0 to 1. The x and y units may be sequential, alternative, orderly or randomly distributed.

A preferred class of such polyamines includes those of the formula

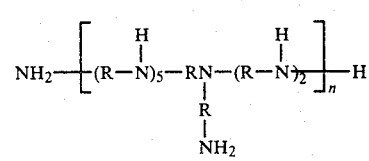

wherein n is an integer, for example, 1 to 20 or more, but preferably 1 to 3, wherein R is preferably ethylene, but may be propylene, butylene, etc. (straight chained or branched).

Preferred embodiments are presented by the following formula:

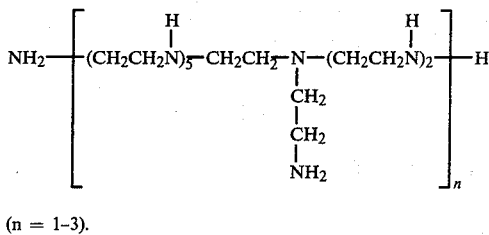

(n = 1-3).

The groups in the brackets may be joined in a head-to-head or a head-to-tail fashion. Compounds described by this formula wherein n=1-3 are manufactured and sold as Polyamines N-400, N-800, N-1200, etc. Polyamine N-400 has the above formula wherein n=1.

U.S. Pat. Nos. 3,200,106 and 3,259,578 are expressly incorporated herein by reference for their disclosure of how to make such polyamines.

Suitable amines also include polyoxyalkylene polyamines, e.g., polyoxyalkylene diamines and polyoxyalkylene triamines, having average molecular weights ranging from about 200 to about 4000 and preferably from about 400 to about 2000. Examples of these polyoxyalkylene polyamines may be characterized by the formulae:

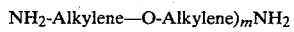

where m has a value of about 3 to about 70 and preferably about 10 to about 35.

where n is such that the total value is from about 1 to 40 with the proviso that the sum of all of the n's is from about 3 to about 70 and generally from about 6 to about 35 and R is a polyvalent saturated hydrocarbon radical of up to 10 carbon atoms having a valence of 3 to 6. The alkylene groups may be straight or branched chains and contain from 1 to 7 carbon atoms, and usually from 1 to 4 carbon atoms. The various alkylene groups may be the same or different.

More specific examples of these polyamines include:

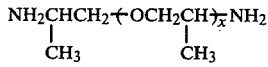

wherein x has a value of from about 3 to 70 and preferably from about 10 to 35 and

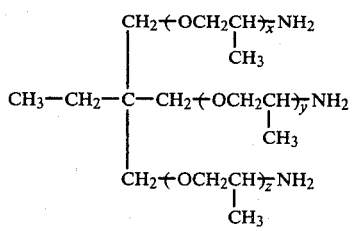

wherein x+y+z have a total value ranging from about 3 to 30 and preferably from about 5 to 10.

Preferred polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403, etc".

U.S. Pat. Nos. 3,804,763 and 3,948,800 are expressly incorporated herein by reference for their disclosure of such polyoxyalkylene polyamines.

Preferred amines for use as the cross-linking agent (C) are the alkylene polyamines, including the polyalkylene polyamines, as described in more detail hereafter. The alkylene polyamines include those conforming to the formula

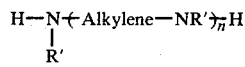

wherein n is from 1 to about 10; each R' is independently a hydrogen atom, a hydrocarbyl group or a hydroxy-substituted hydrocarbyl group having up to about 30 atoms, and the "alkylene" group has from about 1 to about 10 carbon atoms but the preferred alkylene is ethylene or propylene. Especially preferred are the alkylene polyamines where each R' is hydrogen with the ethylene polyamines and mixtures of ethylene polyamines being the most preferred. Usually n will have an average value of from about 2 to about 7. Such alkylene polyamines include methylene polyamine, ethylene polyamines, butylene polyamines, propylene polyamines, pentylene polyamines, hexylene polyamines, heptylene polyamines, etc. The higher homologs of such amines and related aminoalkyl-substituted piperazines are also included. Alkylene polyamines that are useful include ethylene diamine, triethylene tetramine, propylene diamine, trimethylene diamine, hexamethylene diamine, decamethylene diamine, octamethylene diamine, di(heptamethylene)triamine, tripropylene tetramine, tetraethylene pentamine, trimethylene diamine, pentaethylene hexamine, di(trimethylene)triamine, N-(2-aminoethyl)piperazine, 1,4-bis(2-aminoethyl)piperazine, and the like. Higher homologs as are obtained by condensing two or more of the above-illustrated alkylene amines are useful as are mixtures of two or more of any of the afore-described polyamines.

The polyhydric alcohols can be represented by the formula

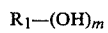

wherein $R_1$ is a monovalent or polyvalent organic group joined to the —OH groups through carbon-to-oxygen bonds (that is, —COH wherein the carbon is not part of a carbonyl group) and m is an integer of at least 2, preferably 2 to about 10. These alcohols can be aliphatic, cycloaliphatic, aromatic, and heterocyclic, including aliphatic-substituted cycloaliphatic alcohols, aliphatic-substituted aromatic alcohols, aliphatic-substituted heterocyclic alcohols, cycloaliphatic-substituted aromatic alcohols, cycloaliphatic-substituted heterocyclic alcohols, heterocyclic-substituted aliphatic alcohols, heterocyclic-substituted cycloaliphatic alcohols, and heterocyclic-substituted aromatic alcohols. Except for the polyoxyalkylene alcohols, the polyhydric alcohols corresponding to the formula $R_1$—$(OH)_m$ will usually contain not more than about 40 carbon atoms and generally not more than about 20 carbon atoms. The alcohols may contain non-hydrocarbons which do not interfere with the reaction of the alcohols with the cross-linkable material (B) of this invention.

Among the polyoxyalkylene alcohols suitable for use herein are those polyols prepared as "block" copolymers. Thus, a hydroxy-substituted compound, $R_2$—$(OH)_q$ (where q is 1 to 6, preferably 2 to 3, and $R_2$ is the residue of a mono- or polyhydric alcohol or mono- or polyhydroxy phenol, naphthol, etc.) is reacted with an alkylene oxide,

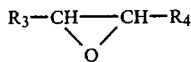

to form a hydrophobic base, $R_3$ being a lower alkyl group of up to 4 carbon atoms, $R_4$ being H or the same as $R_3$ with the proviso that the alkylene oxide does not contain in excess of 10 carbon atoms. This base is then reacted with ethylene oxide to provide a hydrophilic portion resulting in a molecule having both hydrophobic and hydrophilic portions. The relative sizes of these portions can be adjusted by regulating the ratio of reactants, time of reaction, etc., as is obvious to those skilled in the art.

Examples of the polyhydric alcohols are those containing from 2 to about 10 hydroxy groups. These are illustrated, for example, by the alkylene glycols and polyoxyalkylene glycols such as ethylene glycol, diethylene glycol, triethylene glycol, tetraethylene glycol, dipropylene glycol, tripropylene glycol, dibutylene glycol, tributylene glycol, and other alkylene glycols and polyoxyalkylene glycols in which the alkylene radicals contain 2 to about 8 carbon atoms.

A preferred class of alcohols suitable for use in this invention are those polyhydric alcohols containing up to about 12 carbon atoms. This class of alcohols includes glycerol, erythritol, pentaerythritol, dipentaerythritol, gluconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, quinic acid, 2,2,6,6-tetrakis-(hydroxymethyl)cyclohexanol, 1,10-decanediol, digitalose, and the like.

Another preferred class of polyhydric alcohols for use in this invention are the polyhydric alkanols containing 3 to 10 carbon atoms and particularly, those containing 3 to 6 carbon atoms and having at least three hydroxyl groups. Such alcohols are exemplified by glycerol, erythritol, pentaerythritol, mannitol, sorbitol, 2-hydroxymethyl-2-methyl-1,3-propanediol(trimethylolethane), 2-hydroxymethyl-2-ethyl-1,3-propanediol(trimethylopropane), 1,2,4-hexanetriol, and the like.

Other cross-linking agents that are useful include compounds containing two or more epoxy groups per molecule. Examples include polyvalent epoxy compounds obtained by the condensation of bisphenol A and epichlorohydrin or beta-methylepichlorohydrin, polyvalent epoxy compounds obtained by the condensation of novolak or resol and epichlorohydrin; diepoxy compounds having a polyether in the skeleton and alicyclic epoxy compounds.

Other cross-linking agents that are useful include styrene, methylmethacrylate, allyl acetate, triallylcyanurate, diallylphthalate, diallyl isophthalate, and vinyl acetate. These cross-linking agents are particularly useful when the cross-linkable material (B) is an unsaturated polyester resin.

The compositions of the present invention generally contain from about 0.2% to about 15%, preferably about 0.5% to about 10% by weight of component (A), and from about 40% to about 90%, preferably about 50% to about 80% by weight of component (B), such percentages being based on the total weight of said composition. As indicated above, component (C) is an optional component and thus the compositions of the present invention can contain from 0 to about 60% by weight of said component (C), preferably about 5% to about 50%.

The compositions of the invention are also useful as caulks, molding compositions, extruding compositions, and the like. In a preferred embodiment, the compositions of the present invention are useful as thermosetting coating compositions. These coating compositions are generally characterized by a high solids content, that is the solids content is generally at least about 60% by volume, preferably at least about 85% by volume, and advantageously in the range of about 60% to about 100% by volume.

The compositions of the invention are prepared using standard mixing techniques. The specific means by which the colloidal disperse system (A) is incorporated into such compositions does not constitute a critical feature of the present invention. A variety of suitable methods for incorporating the colloidal disperse systems into the component mixtures are readily apparent to those skilled in the art. For example, as the colloidal disperse systems of the invention are liquids or semi-liquids (i.e., gels), they can be mixed directly with the other ingredients of the composition. The disperse systems are mixed with the ingredients of such compositions in the same manner as any other thixotropic agent or additive.

The compositions of the invention can include a solvent. Such solvents should preferably evaporate on standing at ambient temperature. Suitable solvents include hydrocarbon and halo hydrocarbon solvents such as 1,1,1-trichloroethane, benzene, toluene, mineral spirits and turpentine which are especially useful because of their short drying time, but any of the solvents identified as being useful in the preparation of the colloidal disperse systems of the invention can be used. When a high-solids composition is desired, the level of these solvents is preferably minimized.

The compositions of the invention can also include pigments which can provide marked and overall improvement in the resistance of, for example, coatings to corrosion and chemical attack.

The compositions of the invention do not normally require catalysts for curing, although catalysts can be used to speed up curing time. These catalysts can be any catalyst heretofore used in the art and is dependent upon the specific cross-linkable material used. The peroxides and the aromatic sulfonic acids are examples of catalysts that are useful.

The coating compositions of the invention can be applied using conventional coating techniques such as, for example, spraying including airless spraying, brushing, dipping, roller coating, etc. These coating compositions are particularly useful in coil coating operations wherein heat-cured thermosetting coatings are desired.

The following formulations I–III are illustrative of high-solids, thermosetting coating compositions of the present invention. The amounts indicated are in parts by weight. These formulations are prepared by grinding on a high-speed dispersator using a Cowles blade. With each formulation, Part A is initially prepared and ground to a particle size of 7.5H (Hegman). The ingredients in Part B are then added.

|  | I | II | III |
|---|---|---|---|
| Part A: | | | |
| Product of Example 3 | 0.40 | 0.60 | 0.80 |
| Cargill 5770 (a product of Cargill, Inc. identified as a high solids polyester resin) | 16.44 | — | — |
| Cargill 5727-90 (a product of Cargill, Inc. identified as a high solids alkyd resin) | — | 17.79 | — |
| Joncryl 500 (a product of Johnson Wax identified as an acrylic oligomer) | — | — | 22.24 |
| $TiO_2$ | 29.88 | 35.58 | 34.67 |
| Cellosolve (a product of Union Carbide identified as ethylene glycol monoethyl ether) | 2.69 | — | — |
| butyl-Cellosolve (a product of Union Carbide identified as ethylene glycol monobutyl ether) | — | 2.50 | — |
| Surfynol P.C. (a product of Air Products identified as an acetylenic diol blend) | 0.11 | — | — |
| Byk 300 (a product of Byk-Mallinckrodt identified as a paint compatible silicone resin solution) | — | 0.08 | — |
| Xylene | 0.24 | 0.36 | 0.49 |
| n-butanol | — | — | 1.05 |
| Part B: | | | |
| Cargill 5770 | 16.44 | — | — |
| Cargill 5727-90 | — | 18.19 | — |
| Joncryl 500 | — | — | 14.82 |
| Cymel 303 (a product of American Cyanamid identified as hexamethoxy methylmelamine) | 13.15 | 12.05 | 12.71 |
| 10% Sillwet L-722 (a product of Union Carbide identified as a silicone-based wetting agent) in n-butylacetate | 0.36 | — | — |
| n-butanol | 0.60 | — | 10.70 |
| Byk-VP451 (a product of Byk-Mallinckrodt identified as a blocked para-toluene sulfonic acid catalyst) | 1.20 | 0.92 | 1.06 |
| Methylethyl ketone | 2.69 | — | 2.22 |
| n-butyl acetate | 16.20 | — | — |
| butyl-Cellosolve | — | 12.53 | — |
| Dow-Corning No. 57 (a product of Dow-Corning identified as a silicone paint additive) | — | — | 0.04 |

With each of these formulations, minimal viscosity increases are incurred as a result of the addition of the product of Example 3 while sag control is significantly improved. These formulations provide coatings with good gloss, good storage stability and excellent anti-settling characteristics.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A composition comprising:
   (A) a non-Newtonian colloidal disperse system characterized by a neutralization base number of about 3 or less, said system comprising
      (1) solid metal containing colloidal particles predispersed in
      (2) a liquid dispersing medium, and
      (3) as a third component, at least one organic compound which is soluble in said dispersing medium, the molecules of said organic compound being characterized by a hydrophobic portion and at least one polar substituent; and
   (B) an isocyanate-free polymeric cross-linked material formed as a result of reacting a plurality of cross-linkable polymeric polyfunctional materials.

2. The composition of claim 1 wherein the solids content of said composition is at least about 60% by volume.

3. The composition of claim 1 wherein the solids content of said composition is at least about 85% by volume.

4. The composition of claim 1 wherein the colloidal disperse system (A) is present in said composition in an amount of from about 0.2 to about 15% by weight based on the weight of said composition.

5. The composition of claim 1 wherein component (B) is present in said composition in an amount of from about 40% to about 90% by weight based on the weight of said composition.

6. The composition of claim 5 wherein the cross-linking agent is present in said composition in an amount of zero to about 60% by weight based on the weight of said composition.

7. The composition of claim 1 wherein said solid metal-containing colloidal particles (A)(1) comprise solid metal salts.

8. The composition of claim 1 wherein at least about 10% of the solid metal-containing colloidal particles (A)(1) are characterized by having been formed in situ.

9. The composition of claim 1 wherein the solid metal-containing particles (A)(1) are further characterized by having a unit particle size of from about 20 A to about 1000 A.

10. The composition of claim 1 wherein the solid metal-containing particles (A)(1) are selected from alkali and alkaline earth metal salts.

11. The composition of claim 1 wherein said third component (A)(3) comprises an alkali or alkaline earth metal salt of an organic acid.

12. The composition of claim 11 wherein said organic acid is a sulfonic acid or a carboxylic acid.

13. The composition of claim 11 wherein said salt is an alkaline earth metal salt.

14. The composition of claim 1 wherein said solid metal-containing particles (A)(1) comprise alkaline earth metal salts.

15. The composition of claim 1 wherein said solid metal containing colloidal particles (A)(1) comprise calcium carbonate.

16. The composition of claim 1 wherein said third component (A)(3) is represented by the formula

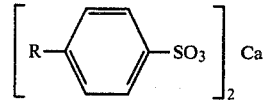

wherein R is a hydrocarbyl group of about 12 to about 30 carbon atoms.

17. The composition of claim 1 wherein said disperse system (A) comprises:

(1) solid calcium carbonate colloidal particles having a unit particle size in the range of about 50 Å to about 300 Å;
(2) an aromatic solvent; and
(3) a third component represented by the formula

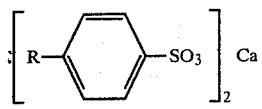

wherein R is a hydrocarbyl group having an average of about 12 to about 30 carbon atoms.

18. The composition of claim 17 wherein the molar ratio of (A)(1) to (A)(3) ranges up to about 20.

19. The composition of claim 1 wherein said system (A) is characterized by a neutralization base number of about one or less.

20. The composition of claim 1 wherein said system (A) is characterized by a neutralization base number of about zero.

21. The composition of claim 20 wherein the self-cross-linking materials include reactive groups selected from the group consisting of hydroxy groups, carboxy groups, alkoxy groups, primary amine groups, secondary amine groups, epoxy groups or a mixture of two or more of said groups.

22. The composition of claim 21 wherein the reactive groups include hydroxy groups and alkoxy groups.

23. The composition of claim 21 wherein the reactive groups include hydroxy groups and carboxy groups.

24. The composition of claim 21 wherein the reactive groups include epoxy groups and carboxy groups.

25. The composition of claim 21 wherein the reactive groups include carboxy groups and alkoxy groups.

26. The composition of claim 21 wherein the reactive groups include epoxy groups and alkoxy groups.

27. The composition of claim 1 wherein the cross-linkable materials include a thermosetting resin.

28. The composition of claim 1 wherein the cross-linkable materials have a number average molecular weight of at least about 300.

29. The composition of claim 1 wherein the cross-linkable materials have a number average molecular weight of about 500 to about 10,000.

30. The composition of claim 1 wherein the cross-linkable materials are selected from the group consisting of alkyd resin, unsaturated polyester resin, epoxy resin, amino resin, phenolic resin, allyl resin, furan resin, silicone resin, acrylic resin, and mixtures thereof.

31. The composition of claim 30 wherein the cross-linking agent has an average of from about 2 to about 6 reactive sites per molecule.

32. The composition of claim 32 wherein the cross-linking agent is formed by reacting formaldehyde with melamine or urea.

33. The composition of claim 1 wherein the cross-linking agent is an alkoxyalkyl or alkylol melamine or urea.

34. The composition of claim 33 wherein the cross-linking agent is an alkoxymethyl melamine or alkoxymethyl urea wherein the alkoxy groups have an average of from 1 to about 4 carbon atoms.

35. The composition of claim 34 wherein the cross-linking agent is hexamethoxymethylmelamine.

36. The composition of claim 35 wherein the cross-linking agent is a compound having an average of two or more carboxylic acid or anhydride groups per molecule.

37. The composition of claim 36 wherein the cross-linking agent has two or more nitrogen atoms having one or two active hydrogen atoms adjacent thereto per molecule.

38. The composition of claim 37 wherein the cross-linking agent has two or more epoxy groups per molecule.

39. The composition of claim 38 wherein the cross-linking agent has two or more hydroxyl groups per molecule.

40. A composition as claimed in claim 1, wherein the cross-linkable materials are self-crossed-linking materials having reactive groups which react to form the cross-linked material.

41. A composition as claimed in claim 1, wherein the cross-linkable materials are reacted and cross-linked to form the cross-linked material via a cross-linking agent.

* * * * *